United States Patent [19]

Wahlquist et al.

[11] 4,431,949
[45] Feb. 14, 1984

[54] LATERAL CONVERGENCE CORRECTION SYSTEM

[75] Inventors: Clayton C. Wahlquist, West Valley City, Utah; Archie M. Barter, Beaverton, Oreg.

[73] Assignee: Tektronix, Inc., Beaverton, Oreg.

[21] Appl. No.: 364,077

[22] Filed: Mar. 31, 1982

[51] Int. Cl.³ .......................... H01J 29/70; H01J 29/76
[52] U.S. Cl. ..................................... 315/368; 315/13 C
[58] Field of Search ............................... 315/368, 13 C

[56] References Cited

U.S. PATENT DOCUMENTS

| | | | |
|---|---|---|---|
| 3,307,067 | 2/1967 | Jachim et al. | 315/13 C |
| 3,781,731 | 12/1973 | Poel | 335/212 |
| 4,203,051 | 5/1980 | Hallett et al. | 315/368 |

FOREIGN PATENT DOCUMENTS

| | | |
|---|---|---|
| 1290174 | 3/1969 | Fed. Rep. of Germany . |
| 42-26756 | 12/1967 | Japan . |
| 50-43630 | 5/1975 | Japan . |
| 54-87113 | 7/1979 | Japan . |
| 55-138986 | 10/1980 | Japan . |

OTHER PUBLICATIONS

Radioschau, vol. 11, 1966, pp. 594 and 595.
J. S. Beeteson et al., IBM J. Res. Develop., vol. 24, No. 5, Sep. 1980, pp. 598–611.

*Primary Examiner*—Theodore M. Blum
*Attorney, Agent, or Firm*—John Smith-Hill; John D. Winkelman

[57] ABSTRACT

An improved lateral convergence deflection system for a delta-gun shadow mask color CRT includes first, second and third lateral convergence coils mounted on the CRT neck radially outward from the paths of the electron beams from the three guns. The coils are connected in series electrically, and are of suitable strength and orientation to provide a substantially unidirectional, vertical field in the path of one (e.g., the blue) beam, and field nulls in the paths of the other two (e.g. the red and green beams). By varying the current passed through the coil by a convergence drive amplifier, the blue beam may be shifted laterally without producing any substantial movement of the other two beams.

11 Claims, 3 Drawing Figures

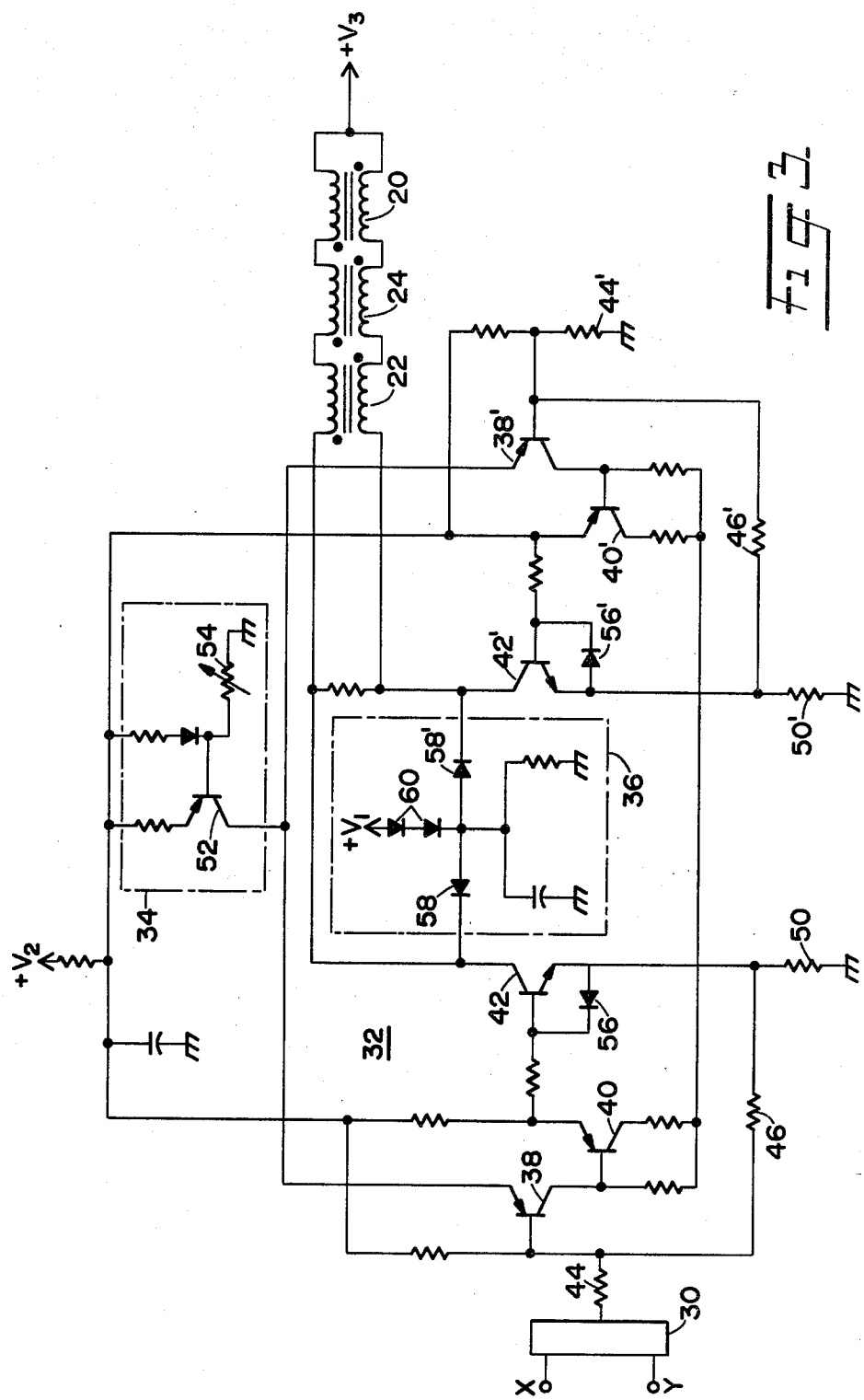

LATERAL CONVERGENCE CORRECTION SYSTEM

BACKGROUND OF THE INVENTION

1. Field of the Invention

The present invention relates generally to deflection convergence systems for multi-gun shadow mask cathode-ray tubes (CRTs), and more particularly to an improved lateral convergence system for such tubes.

2. Description of the Prior Art

The color CRTs used in most present-day television and similar color image display systems have three electron guns—one for each of three primary colors (red, green and blue). The guns are disposed symmetrically in a triangular or "delta" arrangement around the central axis of the tube, and generate individual electron beams that pass through small holes in a shadow mask positioned between the guns and a cathodoluminescent display screen. The display screen is formed of three color phosphors deposited in a regular pattern of dots on the inner face of the CRT. The relative locations of the phosphor deposits and shadow mask apertures is such that, ideally, each electron beam strikes only the deposits of its respective color. An electromagnetic deflection yoke positioned between the electron guns and the screen deflects the three beams over the screen surface. To produce color images correctly, the three electron beams must be coincident at the screen's surface in the absence of a deflecting field (static convergence) and under all conditions of deflection (dynamic convergence).

Static convergence may be achieved by applying fixed magnetic fields to one or more of the beams using suitable external magnets. To maintain the three beams in coincidence during scanning of the screen, suitable waveforms generated in synchronization with the horizontal and vertical deflection signals are applied to individual red, green and blue convergence coils mounted on the CRT neck. The currents produced in these coils by suitable drivers move each beam radially to achieve dynamic convergence.

To obtain complete convergence of the three beams, however, an additional degree of freedom is required. For this purpose a fourth convergence waveform may be applied to a dynamic lateral convergence coil assembly to shift one beam (usually the blue beam) horizontally relative to the others. Such "dynamic blue lateral" convergence is particularly needed with high resolution shadow-mask CRTs, because of the superior convergence accuracy they require.

Prior art lateral convergence correction systems move the blue beam horizontally in one direction while moving the red and green beams in the opposite direction. Such a system is described, for example, in J. S. Beetson et al., *IBM J. Res. Develop.*, vol. 24, no. 5, September 1980, pp. 598–611. While such an approach seems, in theory, to be satisfactory, it is difficult to implement because of the requirements that the red and green beams not separate while they are being shifted laterally, and that the blue beam not move vertically with respect to the red and green beams. They also require a complex magnetic field structure, which is costly to design and produce.

OBJECTS AND SUMMARY OF THE INVENTION

Accordingly, a general object of the present invention is to provide an improved lateral convergence correction system for a delta-gun shadow mask CRT.

A more specific object of the invention is to provide a delta-gun CRT electron beam convergence system capable of shifting one beam laterally without substantial movement of the other two beams.

Another object of the invention is to provide a lateral convergence coil assembly of relatively simple construction.

These and other objects of the present invention are realized, according to the best mode presently contemplated for its practice, by providing a convergence correction system that includes three series-connected lateral convergence coils arranged to provide a vertically-oriented magnetic field in the path of the blue beam and essentially zero magnitude fields in the paths of the red and green beams.

BRIEF DESCRIPTION OF THE DRAWING

The present invention will become more fully understood from the following detailed description and the accompanying drawing, wherein:

FIG. 3 is a simplified schematic diagram of a convergence coil driving circuit.

DETAILED DESCRIPTION

Figure 1:
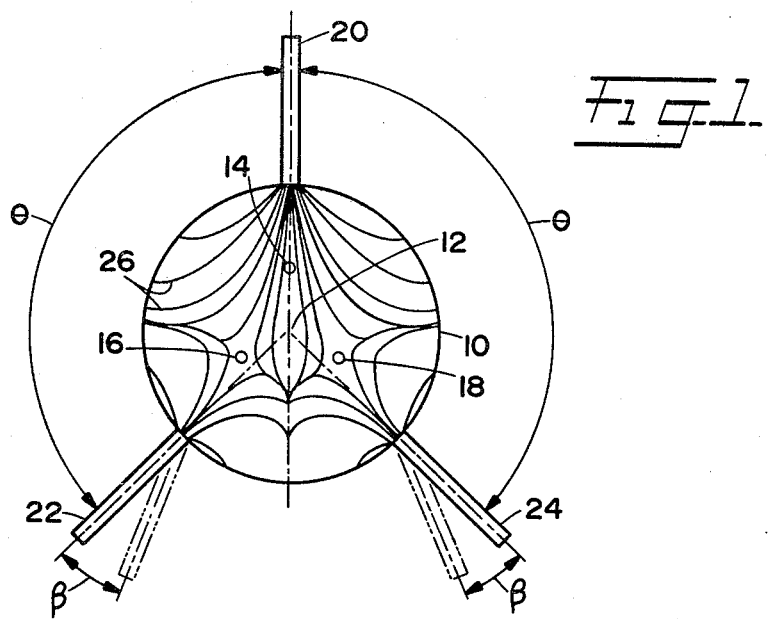
FIG. 1 is a simplified cross-sectional view of a delta-gun CRT neck showing the positions of the lateral convergence coils relative to the three electron beams, and the magnetic field produced by the coils.

Referring now to the drawings, a cross-sectional view of a delta-gun CRT neck at the location of the lateral convergence coils is shown in FIG. 1. Three electron guns (not shown) within neck 10 of the CRT, arranged symmetrically around its central axis 12, emit electron beams that travel along paths 14, 16 and 18 through the neck. For purposes of explanation, the blue beam will be assumed to travel along path 14, the red beam along path 16 and the green beam along path 18. Suitably mounted around the CRT neck radially outward from beam paths 14, 16 and 18 are first, second and third lateral convergence correction coils 20, 22 and 24, respectively. The three coils are connected in series electrically, and are disposed with their planes oriented along the tube's central axis as shown. Coil 20 is mounted directly above the blue beam, and is oriented vertically so that it adds only a vertical component to the magnetic field in the path 14 of the beam. Coils 22 and 24 have an equal number of turns, and are arranged symmetrically relative to coil 20 (and are thus symmetrical about the vertical plane containing coil 20 and beam path 14). The horizontal components of their fields thus cancel each other in the vertical direction. Unipotential field lines 26 show the net magnetic field produced by coils 20, 22 and 24.

Coil 20 has a greater number of turns than coils 22 and 24, and thus has a pole strength that is higher by a factor K. The angle theta ($\theta$) between coil 20 and each of coils 22 and 24, the angle beta ($\beta$) between a radial at angle $\theta$ and the plane of coil 22 (or 24) and pole strength coefficient K are adjusted to provide nulls in the magtic fields surrounding beam paths 16 and 18. Once the proper values for θ, β, and K are established, either empirically or by calculation, the blue beam may be moved laterally without substantial effect on the red and green beams by varying the current flow through the series-connected coils. The direction of blue beam movement will depend, of course, on the direction of current flow in the coils.

Figure 2:
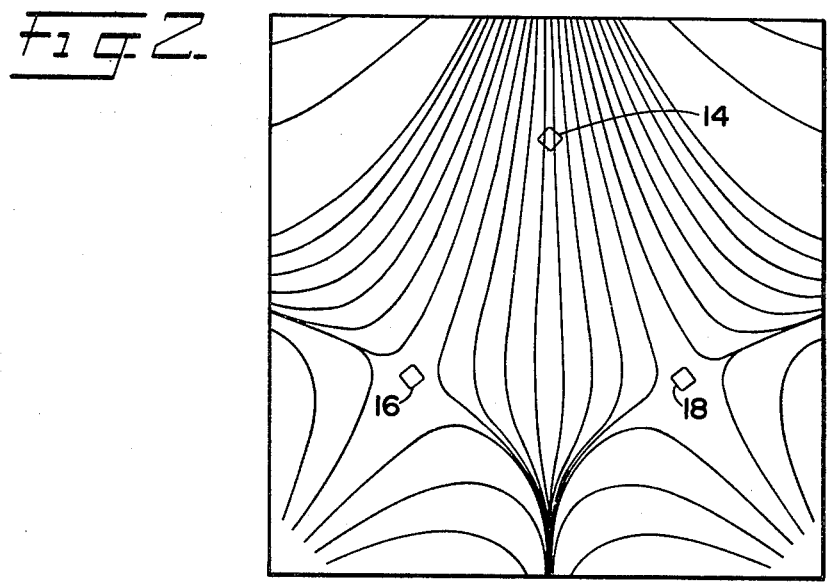
FIG. 2 is an enlarged plot of a calculated magnetic field strength profile of the FIG. 1 convergence coil assembly.

As will be seen in FIG. 1, the blue beam path 14 passes through a relatively high strength, vertically-oriented field, while the magnetic field in the paths 16 and 18 of the red and green beams is at or near zero. FIG. 2, a computer-calculated plot of the field strengths produced by a lateral convergence coil assembly according to the present invention, shows more clearly how the field is effectively nulled at path locations 16 and 18 through which the red and green beams travel.

FIG. 3 shows a suitable electrical circuit for driving lateral convergence coils 20, 22 and 24. Horizontal and vertical scanning signals, which are typical synchronized ramp signals of different frequencies, are applied to the X and Y input terminals, and converted into a suitable convergence signal, such as a parabola signal, by a waveform converter 30. The convergence signal is amplified by a linear class B transconductance output amplifier 32, which includes symmetrically-connected transistors 38 and 38', 40 and 40', 42 and 42', input resistor 44, feedback resistors 46 and 46', controllable current source 34 and anti-saturation circuit 36.

Controllable current source 34 includes PNP transistor 52 and variable resistor 54 to provide a controllable output bias current depending on the setting of the variable resistor. The output current is shared by input stage transistors 38, 38' to drive intermediate stage emitter-follower transistors 40, 40' which drive output stage common emitter transistors 42, 42'. First, second and third coils 20, 22 and 24 are serially connected between the collectors of transistors 42, 42' and voltage source $V_3$. Anti-saturation circuit 36 includes back-to-back diodes 58, 58', which are respectively connected to the collectors of transistors 42, 42'. The common junction of diodes 58, 58' is connected to reference voltage source $+V_1$, through diodes 60. Intermediate emitter-follower transistors 40, 40' may be deleted to simplify the circuit if transient signals are not included in the input signal. However, the emitter follower stage is used in this embodiment to improve the circuit response.

The circuit operates as follows. The convergence control signal from waveform converter 30 is applied to input resistor 44 of amplifier 32. Input stage transistors 38, 38' and current source 34 constitute a conventional differential amplifier. When the input signal to amplifier 32 is negative, transistor 42' is reverse biased or non-conducting, and the left-hand side of amplifier 32 including transistors 38, 40 and 42 and feedback resistor 46 operates as a conventional operational amplifier to develop the corresponding output voltage on the emitter of NPN transistor 42. This output voltage is given by $(-R_{46}/R_{44}) e_{in}$ and causes the signal current to flow in resistor 50. Most of the signal current flows into the emitter and collector of transistor 42 and then in one direction through the left-hand side of convergence coils 22, 24 and 20. Diode 58' in anti-saturation circuit prevents the collector voltage of transistor 42 from decreasing substantially below the supply voltage $V_1$ (e.g., +5 volts), thereby avoiding saturation of transistor 42, which is detrimental to high speed operation.

When the input signal to amplifier 32 is positive, transistor 42 is non-conducting and transistor 38 and all the right hand side circuit section including transistors 38', 40' and 42' are activated to form a noninverting amplifier. As the input signal increases in a positive direction, less current flows in transistor 38 and more current in transistor 38', thereby increasing the base voltage and, in turn, the emitter voltage of transistor 40'. As a result, more collector-emitter current flows in output stage transistor 42' and in an opposite direction through the right side of convergence coils 20, 24 and 22. The symmetrical circuit arrangement of amplifier 32 ensures that the drive to the convergence coils is symmetrical.

Since the coils 20, 22, and 24 are connected in series, the coils will be energized equally. Therefore, the position of the zero flux areas around the red and green beam paths will not be altered with changes in the current through them. The amount or degree of energization of the three convergence coils will effect only the lateral position of the blue beam.

As will be appreciated from the foregoing description, the lateral convergence control apparatus of the present invention is very simple in construction and allows one beam (i.e., the blue beam) to be shifted laterally without affecting the other two beams. This avoids problems inherent in prior art approaches that attempt to shift the red and green beams in a direction opposite to the movement of the blue beam.

The invention being thus described, it will be obvious that the same may be varied in many ways. For example, the three coils may be identical if the pole strength of one of the three coils is controlled by any other external means. The driving circuit for the convergence coils may be of any conventional design. Such variations are not to be regarded as a departure from the scope of the invention and all such modifications are intended to be included within the scope of the following claims.

We claim as our invention:

1. A lateral convergence deflection system for a delta-gun color CRT, comprising
first, second and third means for producing magnetic fields in a region of the CRT traversed by electron beams from the three electron guns, the relative strengths and orientations of the fields being chosen to provide a substantially unidirectional field in the path of one beam and field nulls in the paths of the other beams.

2. The deflection system of claim 1, wherein said first, second and third means comprise first, second and third coils disposed at circumferentially spaced-apart locations around a neck portion of said CRT.

3. The deflection system of claim 2, wherein said coils are connected in series for excitation by a common drive circuit.

4. The deflection system of claim 3, wherein two of said coils produce magnetic fields of substantially identical strength, and wherein the third coil produces a field of greater strength than the other two.

5. A lateral convergence deflection system for a delta-gun color CRT that includes a neck section traversed by first, second and third electron beams from the three guns, said system comprising
first, second and third means mounted on said neck section for producing magnetic fields within the region through which the beams pass, each of said means being disposed radially outward from the path of a different beam, the relative strengths and orientations of said fields being such that a substantially unidirectional radial field is provided in the path of one beam, and field nulls are provided in the paths of the other two beams.

6. The deflection systems of claim 5, wherein said first, second and third means comprise first, second and third coils, two of which produce substantially identical strength fields, the other of which produces a field of greater strength than the other two.

7. The deflection system of claim 6, wherein said first, second and third coils are connected in series, with said two coils having an identical number of turns and said other coil having a greater number of turns.

8. The deflection system of claim 7, further including electrical circuit means for driving the series-connected coils with a convergence correction signal.

9. The deflection system of claim 8, wherein said coils, upon being driven by said correction signal, produce a net field that shifts one of said beams laterally without substantially affecting the other two.

10. The deflection system of claim 9, wherein the laterally-shifted beam is the blue beam in a red, green, blue tricolor CRT.

11. The deflection system of claim 5, wherein said first, second, and third means comprise first, second and third coils disposed at circumferentially spaced-apart locations around the neck portion of said CRT, said coils being connected in series for excitation by a common drive circuit.

* * * * *